United States Patent
Ishii et al.

(10) Patent No.: US 7,898,633 B2
(45) Date of Patent: Mar. 1, 2011

(54) LIQUID CRYSTAL DISPLAY DEVICE HAVING A WEIR PATTERN AND A SEALING MEMBER WITH CURED AND UNCURED PORTIONS

(75) Inventors: Katsuhiko Ishii, Chosei (JP); Takashi Yamamoto, Chiba (JP); Hiroaki Miwa, Yokohama (JP); Setsuo Kobayashi, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 211 days.

(21) Appl. No.: 11/833,287

(22) Filed: Aug. 3, 2007

(65) Prior Publication Data

US 2008/0030670 A1    Feb. 7, 2008

(30) Foreign Application Priority Data

Aug. 3, 2006   (JP) .............................. 2006-212208

(51) Int. Cl.
G02F 1/1339    (2006.01)
(52) U.S. Cl. ........................................ 349/153; 349/190
(58) Field of Classification Search ................. 349/153, 349/154, 190
See application file for complete search history.

(56) References Cited

U.S. PATENT DOCUMENTS

| | | | | |
|---|---|---|---|---|
| 5,037,185 A | * | 8/1991 | Grupp | 349/195 |
| 5,184,239 A | * | 2/1993 | Sano et al. | 349/154 |
| 5,684,555 A | * | 11/1997 | Shiba et al. | 349/149 |
| 6,179,679 B1 | * | 1/2001 | von Gutfeld et al. | 445/25 |
| 6,188,457 B1 | * | 2/2001 | Liu | 349/124 |
| 6,284,087 B1 | * | 9/2001 | von Gutfeld et al. | 156/275.5 |
| 6,459,467 B1 | * | 10/2002 | Hashimoto et al. | 349/153 |
| 6,982,779 B2 | * | 1/2006 | Park et al. | 349/153 |
| 2002/0196393 A1 | * | 12/2002 | Tashiro et al. | 349/106 |
| 2004/0070723 A1 | * | 4/2004 | Imayama et al. | 349/153 |
| 2004/0114089 A1 | * | 6/2004 | Do | 349/158 |
| 2005/0057716 A1 | * | 3/2005 | Hou et al. | 349/154 |
| 2005/0073636 A1 | * | 4/2005 | Liu | 349/123 |
| 2006/0187398 A1 | * | 8/2006 | Isozaki et al. | 349/153 |

* cited by examiner

Primary Examiner—Mark A Robinson
Assistant Examiner—Paul C Lee
(74) Attorney, Agent, or Firm—Antonelli, Terry, Stout & Kraus, LLP.

(57) ABSTRACT

The present invention provides a liquid crystal display device having an ODF (one drop-fill) type middle-sized or miniaturized liquid crystal display panel. In a liquid crystal display device which includes a liquid crystal display panel having a pair of substrates, a sealing member which is formed on a peripheral portion between the pair of substrates without a cut, and liquid crystal which is sealed in a space surrounded by the sealing member between the pair of substrates, one substrate out of the pair of substrates includes at least one line layer which is formed along a first side of one substrate, and a portion of the sealing member which is formed along the first side of one substrate is formed in a zigzag pattern such that the sealing member traverses at least one line layer plural times.

8 Claims, 7 Drawing Sheets

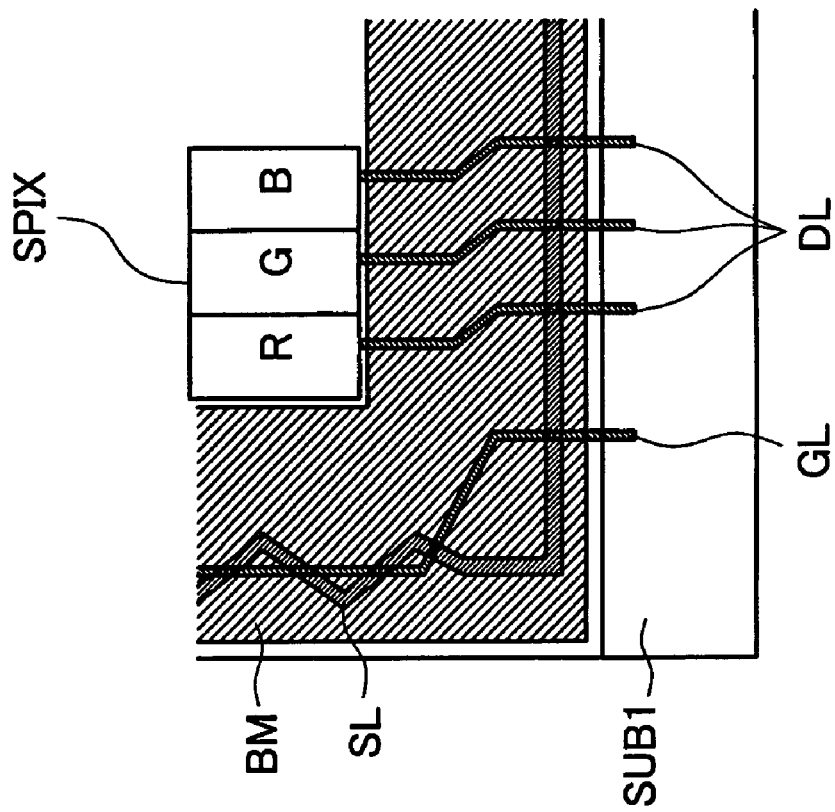
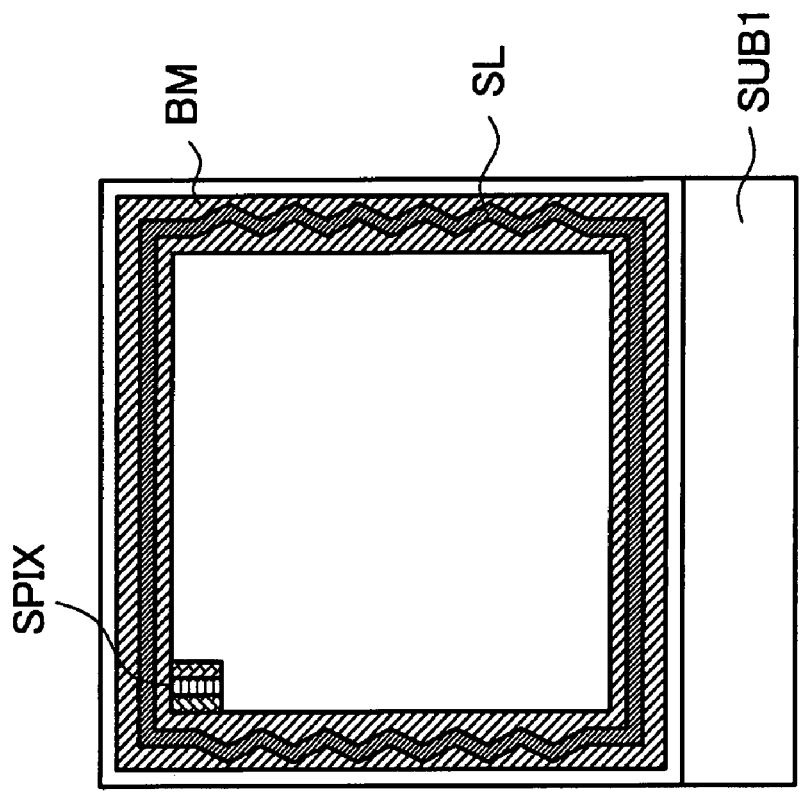

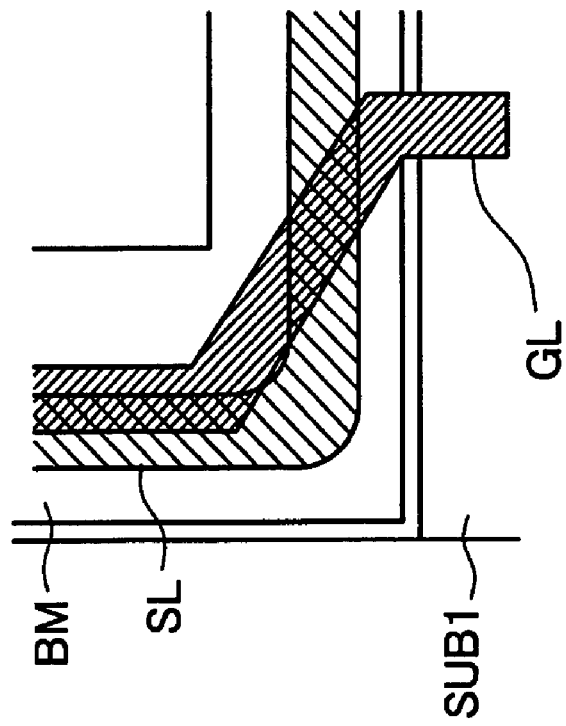
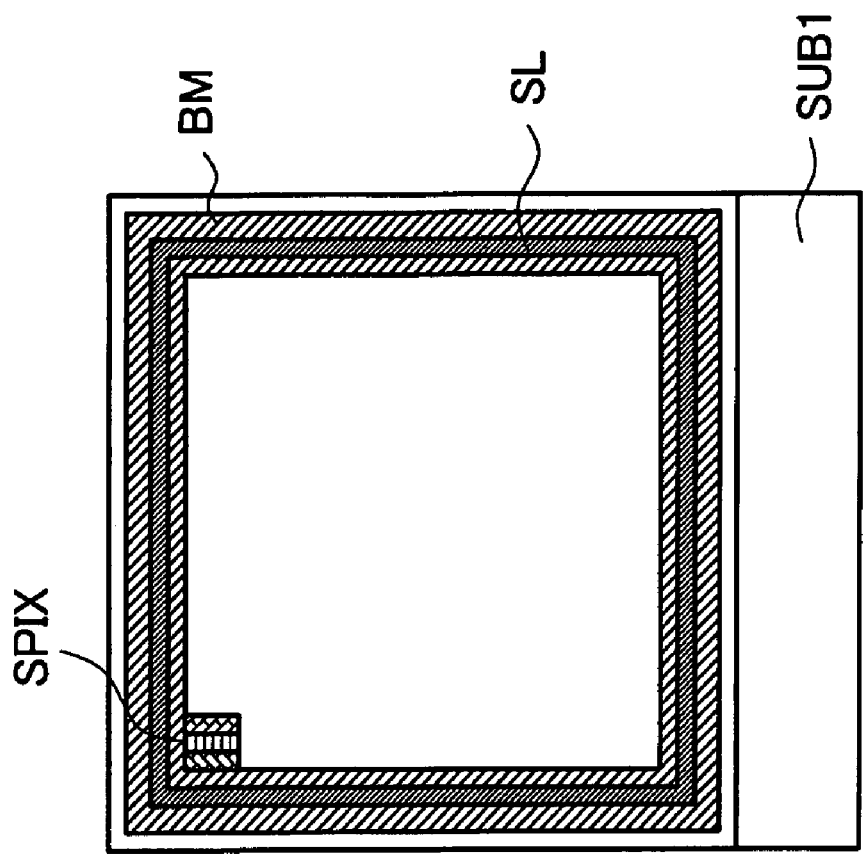

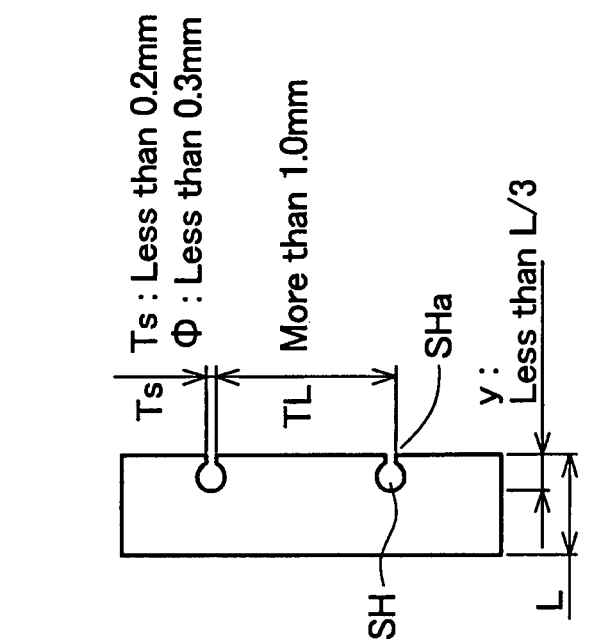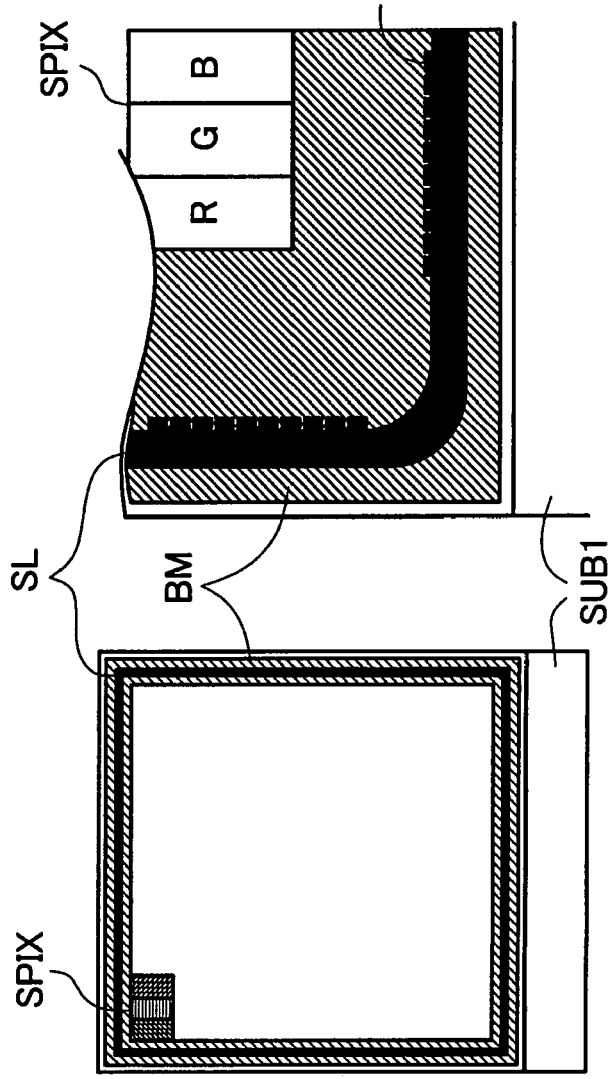

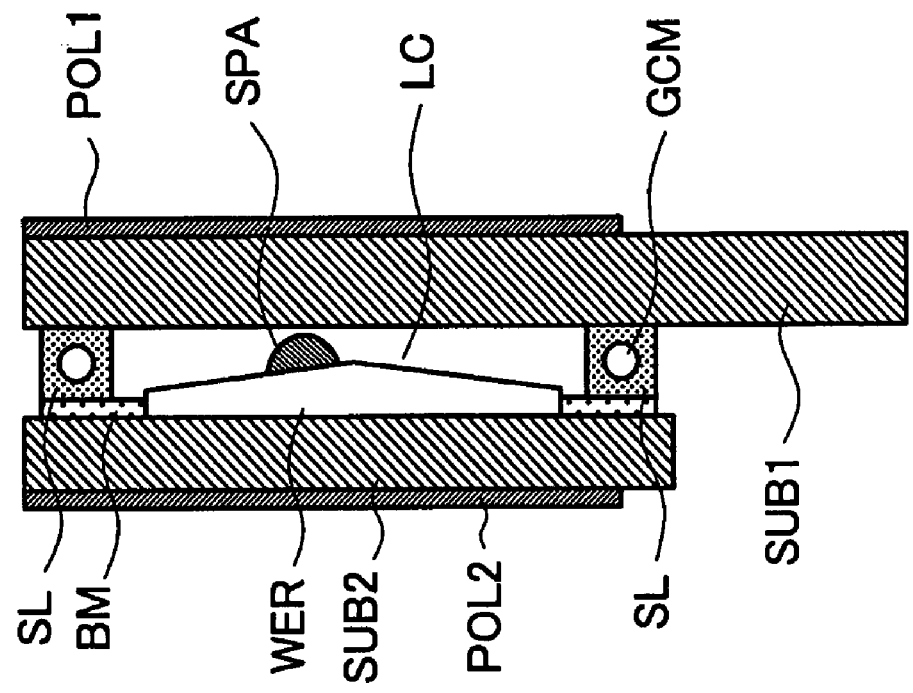
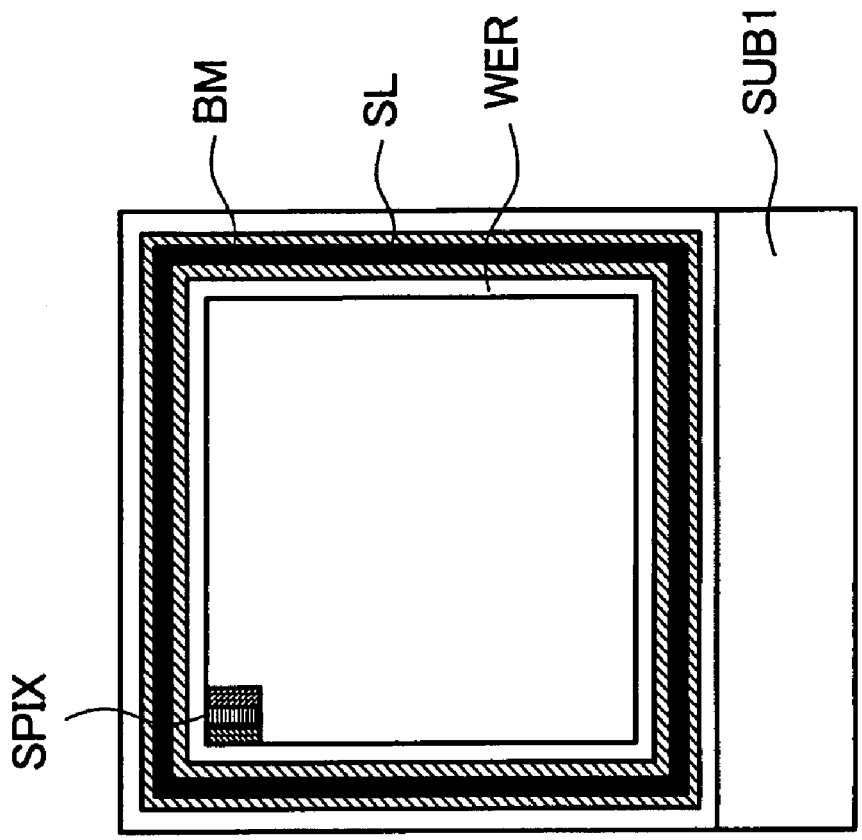

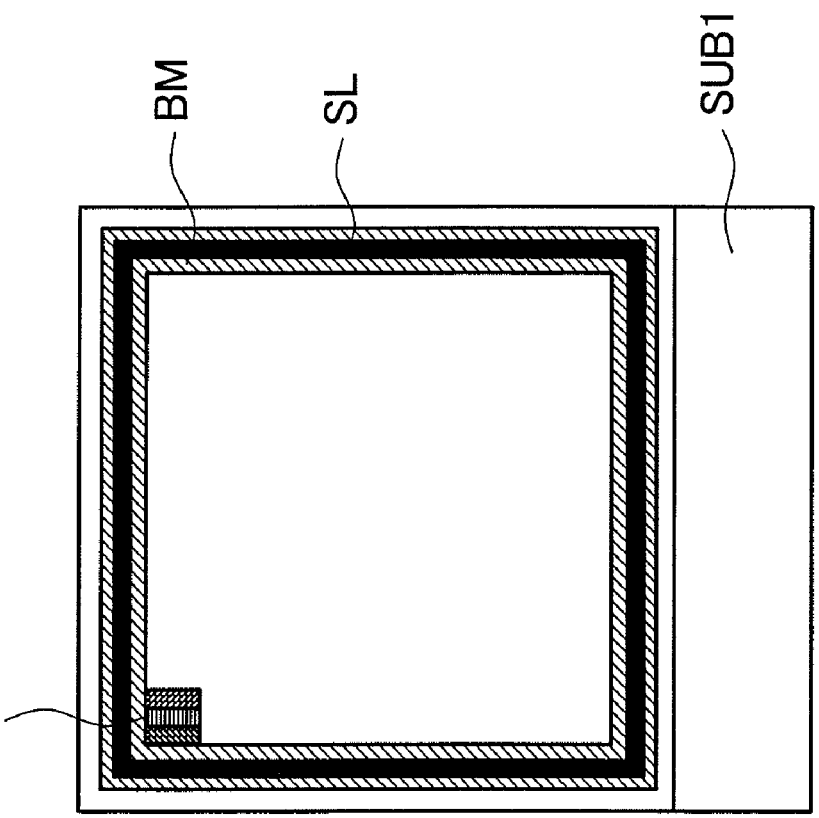
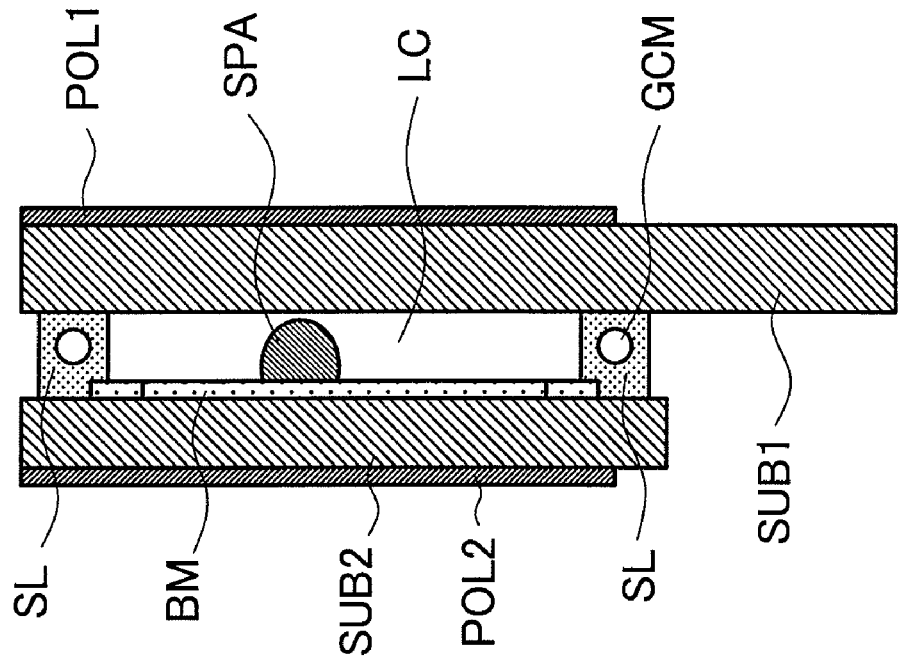

LIQUID CRYSTAL DISPLAY DEVICE HAVING A WEIR PATTERN AND A SEALING MEMBER WITH CURED AND UNCURED PORTIONS

CROSS-REFERENCE TO RELATED APPLICATIONS

The disclosure of Japanese Patent Application No. 2006-212208 filed on Aug. 3, 2006 including the specification, drawings and abstract is incorporated herein by reference in its entirety.

BACKGROUND OF THE INVENTION

1. Field of the Invention

The present invention relates to a liquid crystal display device, and more particularly to a technique which is effectively applicable to a sealing member of a liquid crystal display panel.

2. Description of the Related Art

A TFT (Thin Film Transistor) type liquid crystal display module having a miniaturized liquid crystal display panel has been popularly used as a display part of portable equipment such as a mobile phone.

FIG. 6A and FIG. 6B are views for explaining a liquid crystal display module which includes a conventional middle-sized or miniaturized liquid crystal display panel, wherein FIG. 6A is a schematic front view of the liquid crystal display module and FIG. 6B is a schematic cross-sectional view showing the cross-sectional structure of the liquid crystal display module.

The liquid crystal display panel shown in FIG. 6 is configured as follows. A glass substrate on which pixel electrodes, thin film transistors and the like are formed (also referred to as a TFT substrate; SUB1) and a glass substrate on which color filters and the like are formed (also referred to as a CF substrate; SUB2) overlap each other with a predetermined gap therebetween. Both substrates are adhered to each other using a sealing member (SL) which is formed in a frame shape in the vicinity of a peripheral portion between both substrates. Liquid crystal (LC) is filled into the inside of the sealing member between both substrates and, thereafter, the liquid crystal (LC) is sealed by a sealing material (CLS). Further, polarizers (POL1, POL2) are adhered to outsides of both substrates.

In FIG. 6, symbols SPIX respectively indicate red, green and blue sub pixels, symbols DRV1, DRV2 indicate semiconductor chips which constitute driving circuits (drivers) for driving respective sub pixels (SPIX) of the liquid crystal display panel, symbol FPC indicates a flexible printed circuit board, symbol BM indicates a black matrix, symbol SPA indicates spacers, and symbol GCM indicates a gap control material which is mixed into the sealing member (SL).

FIG. 7A and FIG. 7B are views for explaining a liquid crystal display module which includes another conventional middle-sized or miniaturized liquid crystal display panel, wherein FIG. 7A is a schematic front view of the liquid crystal display module and FIG. 7B is the schematic cross-sectional view showing the cross-sectional structure of the liquid crystal display module.

The liquid crystal display panel shown in FIG. 7A and FIG. 7B is an ODF (one-drip-fill) type liquid crystal display panel. The liquid crystal display panel shown in FIG. 7A and FIG. 7B is configured as follows. A sealing member (SL) made of a material which contains an ultraviolet curing resin as a major component is formed on a periphery of a glass substrate (SUB2) outside the black matrix (BM) without a cut. Liquid crystal (LC) is filled in a portion surrounded by the sealing member (SL) and, thereafter, a glass substrate (SUB1) is made to overlap the glass substrate (SUB2), and the ultraviolet ray (UV) radiation is performed on a glass substrate (SUB2) side thus curing the sealing member (SL).

Here, in FIG. 7 as well as in FIG. 1, FIG. 2, FIG. 4 and FIG. 5 described later, the illustration of the semiconductor chips (DRV1, DRV2) and the flexible printed circuit board (FPC) is omitted.

SUMMARY OF THE INVENTION

The above-mentioned liquid crystal display panel shown in FIG. 6A and FIG. 6B adopts a sealing method in which a sealing hole is formed in the sealing member (SL) and the liquid crystal (LC) is filled in a vacuum through the sealing hole. Such a method is applied to an actual manufacturing method of the liquid crystal display panel. This method has, however, a possibility of giving rise to a drawback that a sealing material and a sealing step are indispensable thus pushing up a cost of a product, a drawback that the sealing material contaminates the liquid crystal (LC) thus generating display irregularities, and a drawback that the sealing material scatters on a surface of the liquid crystal display panel and generates the intrusion of foreign materials thus lowering a yield rate.

Further, in the above-mentioned liquid crystal display panel shown in FIG. 7, the radiation of ultraviolet rays (UV) is performed from the glass substrate (SUB2) side to cure the sealing member (SL) and hence, there is no tolerance in design against leaking of light from an outer periphery of the liquid crystal display panel or narrowing of a picture frame whereby it is difficult to apply such a sealing method to a middle-sized or miniaturized liquid crystal display panel.

The present invention has been made to overcome the above-mentioned drawbacks of the related art, and it is an object of the present invention to provide a liquid crystal display device having an ODF (one-drop-fill) type middle-sized or miniaturized liquid crystal display panel.

The above-mentioned and other objects and novel features of the present invention will become apparent from the description of this specification and attached drawings.

To briefly explain the summary of typical inventions among the inventions disclosed in this specification, they are as follows.

(1) The present invention is directed to a liquid crystal display device which includes a liquid crystal display panel having a pair of substrates, a sealing member which is formed on a peripheral portion between the pair of substrates without a cut, and liquid crystal which is sealed in a space surrounded by the sealing member between the pair of substrates, wherein one substrate out of the pair of substrates includes at least one line layer which is formed along a first side of one substrate, and a portion of the sealing member which is formed along the first side of one substrate is formed in a zigzag pattern such that the sealing member traverses at least one line layer plural times.

(2) The present invention is directed to a liquid crystal display device which includes a liquid crystal display panel having a pair of substrates, a sealing member which is formed on a peripheral portion between the pair of substrates without a cut, and liquid crystal which is sealed in a space surrounded by the sealing member between the pair of substrates, wherein one substrate out of the pair of substrates includes at least one line layer which is formed along a first side of one substrate, and a portion of the sealing member which is formed along the first side of one substrate and at least one line layer overlap each other.

(3) In the above-mentioned constitution (2), assuming a width of the portion of the sealing member which is formed along a first side of one substrate as L and a width of a portion where the portion of the sealing member which is formed along the first side of one substrate and at least one line layer overlap each other as T, a relationship of T<(L/2) is satisfied.

(4) In any one of the above-mentioned constitutions (1) to (3), the first side of one substrate is at least one side of long sides of one substrate.

(5) The present invention is directed to a liquid crystal display device which includes a liquid crystal display panel having a pair of substrates, a sealing member which is formed on a peripheral portion between the pair of substrates without a cut, and liquid crystal which is sealed in a space surrounded by the sealing member between the pair of substrates, wherein a hole portion and an opening portion are formed in a portion of the sealing member, and the opening portion opens a space of the hole portion toward the space surrounded by the sealing member.

(6) In the above-mentioned constitution (5), the hole portion is arranged at a corner portion of the sealing member, and the hole portion is formed in a columnar shape.

(7) In any one of the above-mentioned constitutions (1) to (6), the liquid crystal display device includes a weir pattern on the space side of the sealing member, and a height of the weir pattern assumes a largest value at a center portion of the weir pattern and is gradually lowered toward both sides of the weir pattern.

(8) The present invention is directed to a liquid crystal display device which includes a liquid crystal display panel having a pair of substrates, a sealing member which is formed on a peripheral portion between the pair of substrates without a cut, and liquid crystal which is sealed in a space surrounded by the sealing member between the pair of substrates, wherein the liquid crystal display device includes a weir pattern on the space side of the sealing member, and a height of the weir pattern assumes a largest value at a center portion of the weir pattern and is gradually decreased toward both sides of the weir pattern.

(9) In any one of the above-mentioned constitutions (1) to (8), another substrate out of the pair of substrates includes a black matrix on the peripheral portion thereof and, as viewed from another substrate side, the sealing member is formed within a region in which the black matrix is formed.

(10) In any one of the above-mentioned constitutions (1) to (9), the sealing member is made of a material which contains a photo-curing resin as a main component.

To briefly explain advantageous effects obtained by the typical inventions among the inventions described in this specification, they are as follows.

According to the present invention, it is possible to provide a liquid crystal display device which includes an ODF (one-drop-fill) type middle-sized or miniaturized liquid crystal display panel.

BRIEF DESCRIPTION OF THE DRAWINGS

FIG. 1A and FIG. 1B are views for explaining a liquid crystal display module which includes a middle-sized or miniaturized liquid crystal display panel of an embodiment 1 of the present invention;

FIG. 2A and FIG. 2B are views for explaining a liquid crystal display module which includes a middle-sized or miniaturized liquid crystal display panel of an embodiment 2 of the present invention;

FIG. 4A to FIG. 4C are views for explaining a liquid crystal display module which includes a middle-sized or miniaturized liquid crystal display panel of an embodiment 3 of the present invention;

FIG. 5A and FIG. 5B are views for explaining a liquid crystal display module which includes a middle-sized or miniaturized liquid crystal display panel of an embodiment 4 of the present invention;

FIG. 7A and FIG. 7B are views for explaining a liquid crystal display module which includes another conventional middle-sized or miniaturized liquid crystal display panel.

DESCRIPTION OF THE PREFERRED EMBODIMENTS

Hereinafter, embodiments of the present invention are explained in detail in conjunction with drawings.

Here, in all drawings for explaining embodiments, parts having identical functions are given same symbols and their repeated explanation is omitted.

Embodiment 1

FIG. 1A and FIG. 1B are views for explaining a liquid crystal display module which includes a middle-sized or miniaturized liquid crystal display panel of an embodiment 1 of the present invention, wherein FIG. 1A is a schematic front view of the liquid crystal display module and FIG. 1B is an enlarged schematic view showing a peripheral portion of a sealing member.

In FIG. 1, symbol SUB1 indicates a glass substrate, symbol SL indicates a sealing member, symbol SPIX indicates sub pixels, symbol BM indicates a black matrix, symbol GL indicates gate lines, and symbol DL indicates video lines which supply video voltage to respective sub pixels (SPIX).

This embodiment adopts a middle-sized or miniaturized ODF-type liquid crystal display panel of "1 inch to 8 inch" size (diagonal size: 2.54 to 20.32 cm), wherein the liquid crystal display panel is characterized in that a portion of the sealing member (SL) formed along a first side (long side) of the glass substrate (SUB1) is formed in a zigzag pattern such that the portion traverses at least one line layer of a line portion formed on the glass substrate (SUB1) plural times. In FIG. 1, a case is shown in which the above-mentioned at least one line layer is formed of a gate line (GL).

Further, in this embodiment, the sealing member (SL) is formed on the glass substrate (SUB2), for example, using a dispenser or by screen printing.

In this manner, according to this embodiment, the portion of the sealing member (SL) which is formed along the first side (long side) of the glass substrate (SUB1) is formed in a zigzag pattern to facilitate the wrapping-around of ultraviolet rays (UV) and hence, it is possible to form the sealing member (SL) by curing a UV sealing material by the radiation of ultraviolet rays from the glass substrate (SUB1) side.

Accordingly, in this embodiment, it is unnecessary to form a window portion for radiating ultraviolet rays in the black matrix (BM) thus enabling a design of narrowing a picture frame of the liquid crystal display panel.

Further, since the portion of the sealing member (SL) which is formed along the first side (long side) of the glass substrate (SUB1) is formed in a zigzag pattern, a sealing area can be increased compared to a conventional linear pattern thus enhancing a package strength.

Embodiment 2

FIG. 2A and FIG. 2B are views for explaining a liquid crystal display module which includes a middle-sized or miniaturized liquid crystal display panel of an embodiment 2 of the present invention, wherein FIG. 2A is a schematic front view of the liquid crystal display module and FIG. 2B is an enlarged schematic view showing a peripheral portion of a sealing member.

Figure 3A:
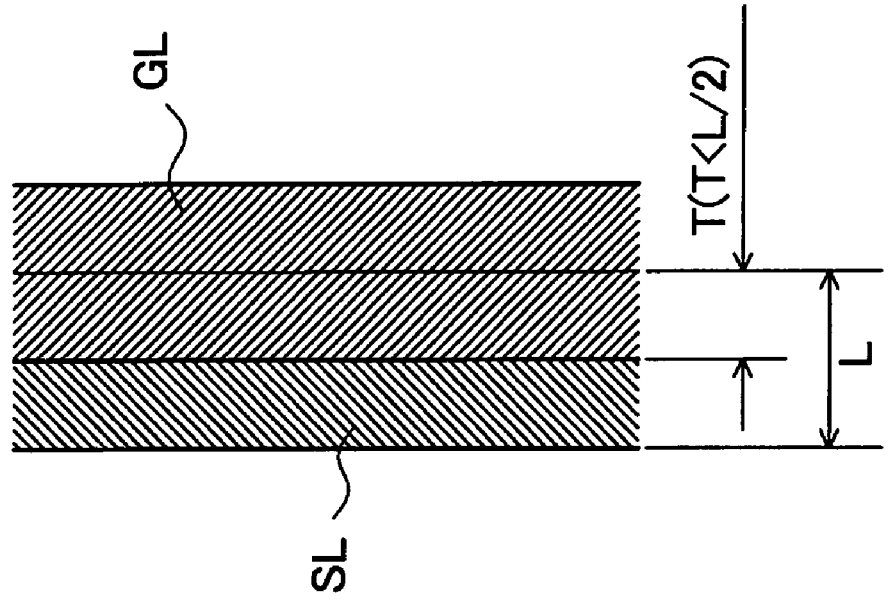
FIG. 3A and FIG. 3B are views for explaining a sealing member of the embodiment 2 of the present invention.
Figure 3B:
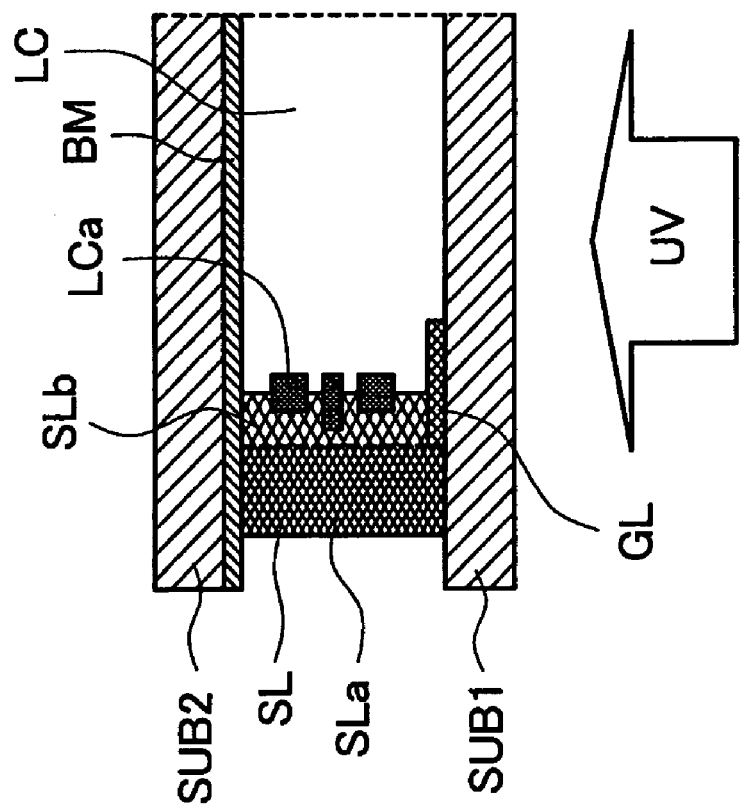
Figure 6B:
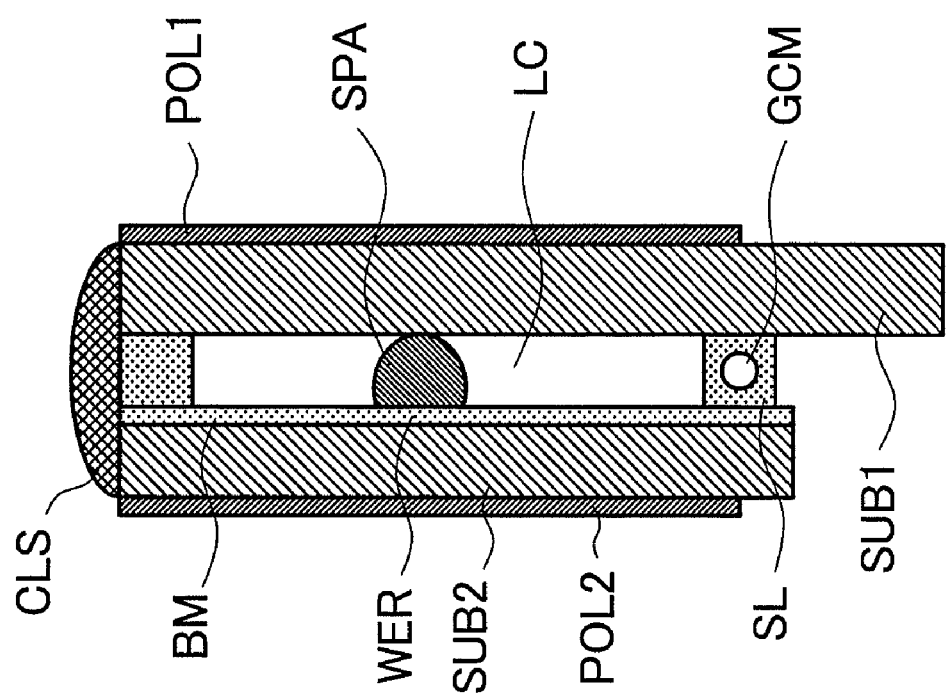
FIG. 6A and FIG. 6B are views for explaining a liquid crystal display module which includes a conventional middle-sized or miniaturized liquid crystal display panel.
Figure 6A:
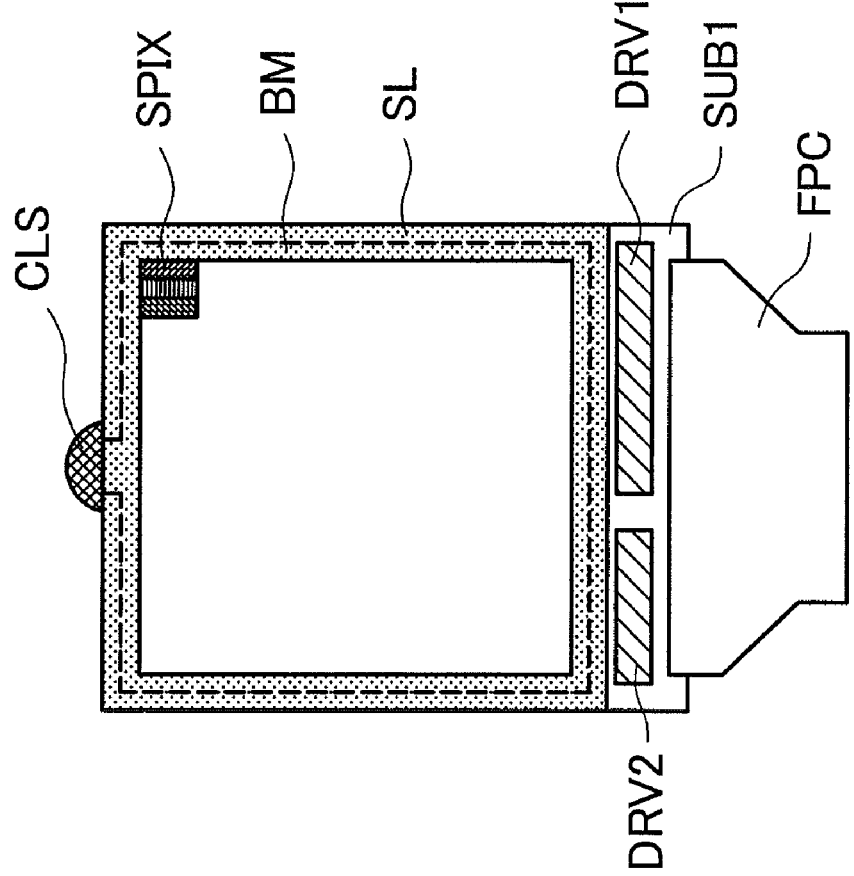

Further, FIG. 3A and FIG. 3B are views for explaining a sealing member of this embodiment, wherein FIG. 3A is an enlarged schematic front view of the sealing member and FIG. 3B is an enlarged schematic cross-sectional view showing a vicinity of the sealing member.

In FIG. 2 and FIG. 3, symbols SUB1 and SUB2 indicate glass substrates, symbol SL indicates the sealing member, symbol SPIX indicates a sub pixel, symbol GL indicates a gate line layer, symbol SLa indicates a sealing material curing portion, symbol SLb indicates a sealing material uncured portion, symbol LC indicates liquid crystal, symbol LCa indicates a liquid crystal insertion portion, and symbol UV indicates ultraviolet rays.

This embodiment adopts a middle-sized or miniaturized ODF-type liquid crystal display panel of "1 inch to 3 inch" size (diagonal size: 2.54 to 7.62 cm), wherein the liquid crystal display panel is characterized in that the sealing member (SL) below a black matrix (BM) overlaps a portion of a line (the gate line GL in FIG. 2) on the glass substrate (SUB1) thus forming the sealing material cured portion (SLa) and the sealing material uncured portion (SLb). Further, as indicated by the liquid crystal insertion portion (LCa) shown in FIG. 3B, when a quantity of liquid crystal which is 1.0 to 1.2 times as large as a target volume is filled in a portion surrounded by the sealing member (SL), surplus liquid crystal is inserted into the sealing material uncured portion (SLb) and hence, a predetermined cell gap is obtained.

Here, as shown in FIG. 3A, assuming a width of the sealing member (SL) as L and a width of the sealing member (SL) where the sealing member (SL) partially overlaps the gate line (GL) of the glass substrate (SUB1) as T, it is preferable to set the width T to a value which is equal to or less than (L/2) (T≦L/2).

Further, in this embodiment, the sealing member (SL) is formed on the glass substrate (SUB2), for example, using a dispenser or by screen printing.

In this manner, according to this embodiment, by dividing the sealing member (SL) into the sealing material curing portion (SLa) and the sealing material uncured portion (SLb), the surplus liquid crystal is inserted into the liquid crystal insertion portion (LCa) and hence, peripheral irregularities attributed to the deflection of the substrate can be reduced thus increasing a margin of a liquid crystal dropping quantity in an ODF method.

Embodiment 3

FIG. 4A to FIG. 4C are views for explaining a liquid crystal display module which includes a middle-sized or miniaturized liquid crystal display panel of an embodiment 3 of the present invention, wherein FIG. 4A is a schematic front view, FIG. 4B is an enlarged schematic view of a peripheral portion of a sealing member, and FIG. 4C is an enlarged schematic view of the sealing member.

In FIG. 4, symbol SUB1 indicates a glass substrate, symbol SL indicates the sealing member, symbol SPIX indicates sub pixels, symbol SH indicates hole portions, and symbol SHa indicates opening portions.

This embodiment adopts a middle-sized or miniaturized ODF-type liquid crystal display panel of "1 inch to 3 inch" size (diagonal size: 2.54 to 7.62 cm), wherein the liquid crystal display panel is characterized in that the hole portions (SH) and the opening portions (SHa) which open the hole portions (SH) toward a space in which liquid crystal (LC) is filled are formed in the sealing member (SL) below a black matrix (BM), and a quantity of liquid crystal which is 1.2 to 1.5 times as large as a target volume is filled in the space, and, at a point of time that a predetermined cell gap is obtained under an external pressure, surplus liquid crystal is stored in the hole portions (SH) formed in the sealing member (SL).

Here, the hole portions (SH) may preferably be arranged at a corner portion of the sealing member (SL), and a shape of the hole portion (SH) may preferably be a columnar shape. Here, assuming a width of the sealing member (SL) as L and a depth of the hole portion (SH) in the sealing member (SL) as y, the depth y may preferably be set to a value equal to or less than L/3 (y≦L/3).

Further, assuming a distance between the hole portions (SH) as TL, the distance TL may preferably be set to a value equal to or more than 11.0 mm (TL≦11.0 mm). Still further, when the shape of the hole portion (SH) is a columnar shape, a diameter φ of the hole portion (SH) may preferably be set to a value equal to or less than 0.3 mm (φ≦0.3 mm).

Here, assuming a width of the opening portion (SHa) as Ts, the width Ts may preferably be set to a value equal to or less than 0.2 mm (Ts≦0.2 mm).

Further, in this embodiment, the sealing member (SL) is formed on the glass substrate (SUB2), for example, by screen printing.

In this manner, according to this embodiment, by forming the hole portions (SH) in the sealing member (SL), it is possible to store the liquid crystal and hence, when a quantity of liquid crystal is increased, the liquid crystal enters the hole portions (SH), while when the quantity of liquid crystal is decreased, the sealing member (SL) extends and closes the hole portions (SH) thus ensuring a margin of dropping of the liquid crystal.

Embodiment 4

FIG. 5A and FIG. 5B are views for explaining a liquid crystal display module which includes a middle-sized or miniaturized liquid crystal display panel of an embodiment 4 of the present invention, wherein FIG. 5A is a schematic front view, and FIG. 5B is a schematic cross-sectional view showing the cross-sectional structure of the liquid crystal display module.

The liquid crystal display panel of this embodiment is a liquid crystal display panel which includes the sealing member (SL) of the above-mentioned each embodiment and a weir pattern (WER) which is arranged inside the sealing member (SL), wherein surplus liquid crystal is made to flow into a corner portion of the sealing member (SL) by the weir pattern (WER) formed in an inner surface of the sealing member (SL) and, further, the surplus liquid crystal is stored in the hole portions (SH) formed in the sealing member (SL) of the embodiment 3, for example.

Here, the weir pattern (WER) is made of silicon, for example. As shown in FIG. 5B, the weir pattern (WER) is configured such that a height of the weir pattern (WER) assumes a largest value at a center portion of the weir pattern (WER) and is gradually lowered toward both sides of the weir pattern (WER). This weir pattern (WER) is formed, as shown in FIG. 5A, on each side of the liquid crystal display panel.

Further, in this embodiment, the sealing member (SL) is formed on the glass substrate (SUB2), for example, by using a dispenser or by screen printing.

In this embodiment, by arranging the weir (WER) inside the sealing member (SL), the insertion of the liquid crystal into the sealing member (SL) is prevented thus maintaining an original sealing strength.

Although the present invention made by the inventors of the present invention has been specifically explained in conjunction with the above-mentioned embodiments, it is needless to say that the present invention is not limited to the above-mentioned embodiments, and various modifications are conceivable without departing from the gist of the present invention.

What is claimed is:

1. A liquid crystal display device comprising a liquid crystal display panel which includes a pair of substrates, a sealing member which is formed on a peripheral portion between the pair of substrates without a cut, and liquid crystal which is sealed in a space surrounded by the sealing member between the pair of substrates, wherein one substrate out of the pair of substrates includes at least one line layer which is formed along a first side of one substrate, a portion of the sealing member which is formed along the first side of one substrate and at least one line layer overlap each other and extend along the first side, the sealing member is an ultraviolet ray curable sealing material, the portion of the sealing member of the ultraviolet ray curable sealing material which is overlapped with the at least one line layer is an uncured portion of the sealing material, and an other portion of the sealing member of the ultraviolet ray curable sealing member which is not overlapped with the at least one line layer is a cured portion of the sealing material, wherein the uncured portion of the sealing material contacts the liquid crystal which is in the sealed space surrounded by the sealing member;

wherein the liquid crystal display device includes a weir pattern on a space side of the sealing member, and a height of the weir pattern assumes a largest value at a center portion of the weir pattern which corresponds to a center of the sealed space of the liquid crystal and is gradually decreased toward opposite sides of the weir pattern which are adjacent to the sealing member, wherein a height of the center portion of the weir pattern is less than a height of the space between the pair of substrates, and wherein the weir pattern continuously extends over a substantial portion of the first side of the one substrate.

2. A liquid crystal display device according to claim 1, wherein assuming a width of the portion of the sealing member which is formed along the first side of the one substrate as L and a width of a portion where the portion of the sealing member which is formed along the first side of the one substrate and at least one line layer overlap each other as T, a relationship of T<(L/2) is satisfied.

3. A liquid crystal display device according to claim 1, wherein the first side of the one substrate is at least one side of long sides of the one substrate.

4. A liquid crystal display device comprising a liquid crystal display panel which includes a pair of substrates, a sealing member which is formed on a peripheral portion between the pair of substrates without a cut, and liquid crystal which is sealed in a space surrounded by the sealing member between the pair of substrates, wherein one substrate out of the pair of substrates includes at least one line layer which is formed along a first side of one substrate, a portion of the sealing member which is formed along the first side of one substrate and at least one line layer overlap each other and extend along the first side the sealing member is an ultraviolet ray curable sealing material, and the portion of the sealing member of the ultraviolet ray curable sealing material which is overlapped with the at least one line layer is an uncured portion of the sealing material, and an other portion of the sealing member of the ultraviolet ray curable sealing member which is not overlapped with the at least one line layer is a cured portion of the sealing material, wherein the uncured portion of the sealing material contacts the liquid crystal which is in the sealed space surrounded by the sealing member, wherein the liquid crystal display device includes a weir pattern on a space side of the sealing member, and a height of the weir pattern assumes a largest value at a center portion of the weir pattern which corresponds to a center of the sealed space of the liquid crystal and is gradually lowered toward opposite sides of the weir pattern which are adjacent to the sealing member, wherein a height of the center portion of the weir pattern is less than a height of the space between the pair of substrates, and wherein the weir pattern continuously extends over a substantial portion of one of the pair of substrates.

5. A liquid crystal display device according to claim 4, wherein the hole portion is arranged at a corner portion of the sealing member, and the hole portion is formed in a columnar shape.

6. A liquid crystal display device comprising a liquid crystal display panel which includes a pair of substrates, a sealing member which is formed on a peripheral portion between the pair of substrates without a cut, and liquid crystal which is sealed in a space surrounded by the sealing member between the pair of substrates, wherein the liquid crystal display device includes a weir pattern on a space side of the sealing member, and a height of the weir pattern assumes a largest value at a center portion of the weir pattern which corresponds to a center of the sealed space of the liquid crystal and is gradually decreased toward opposite sides of the weir pattern which are adjacent to the sealing member, and a height of the center portion of the weir pattern is less than a height of the space between the pair of substrates, and wherein the weir pattern continuously extends over a substantial portion of one of the pair of substrates.

7. A liquid crystal display device according to claim 6, wherein one substrate out of the pair of substrates includes a black matrix on the peripheral portion thereof and, as viewed from another substrate side, the sealing member is formed within a region in which the black matrix is formed.

8. A liquid crystal display device according to claim 6, wherein the sealing member is made of a material which contains a photo-curing resin as a main component.

* * * * *